United States Patent Office 3,346,524
Patented Oct. 10, 1967

3,346,524
GLOSS RETAINING URETHANE COATING
COMPOSITION
Gerald R. Skreckoski, Buffalo, N.Y., assignor to Allied
Chemical Corporation, New York, N.Y., a corporation
of New York
No Drawing. Filed June 24, 1963, Ser. No. 290,155
13 Claims. (Cl. 260—22)

This invention relates to novel coating compositions. More particularly it relates to unrethane coating compositions derived from methylene-bis-(4-cyclohexylisocyanate) which are characterized by excellent color stability and gloss retention.

Coating compositions derived from methylene-bis-(4-cyclohexylisocyanate) have been prepared but the resultant coatings, though color stable, have been deficient in one or more essential physical properties, notably gloss retention on weathering. It is therefore a principal object of this invention to devise novel coating compositions which are characterized by color stability and gloss retention.

Another object is to provide a novel process for the preparation of the new coating compositions derived from methylene-bis-(4-cyclohexylisocyanate).

Other objects and advantages ancillary thereto will be obvious from the following description of my invention.

The coating compositions of the present invention are urethane reaction products of methylene-bis-(4-cyclohexylisocyanate), or an isocyanate rich adduct thereof, and a polyester of a fatty acid having free hydroxyl groups.

The preferred isocyanate component is a solvent solution of methylene-bis-(4-cyclohexylisocyanate) itself. Less preferably, an adduct of this isocyanate can be used. Such adducts containing free isocyanate groups are prepared by heating together a polyol such as trimethylolpropane, under essentially anhydrous conditions, and subsequently combining the isocyanate with a hydroxyl rich fatty acid polyester in the presence of a catalyst preferably an organo tin compound, e.g. dibutyl tin dilaurate. The isocyanate and polyol are preferably combined in such amounts as to provide an NCO/OH ratio of 2.0:1 or greater.

The novel compositions of the present invention which can be applied to a substrate by conventional methods, i.e., by spraying, brushing, dipping, flow coating and the like, dry to tack-free films in about 6 to 12 hours. When cured, they are tough and flexible as expected of urethane coatings, non-yellowing but, surprisingly, retain their glossy appearance for extended periods of time.

The fatty acid polyesters containing free hydroxy groups which are suitable for use in the prepartion of the improved coating compositions are reaction products of one or a mixture of fatty acids, e.g., palmitic acids, oleic acid, stearic acid, particularly the fatty acids derived from glyceryl esters of fatty acids such as castor oil and the like and also dimerized fatty acids, with one or a mixture of polyols having a molecular weight of from 62 to 164 such as ethylene glycol, propylene glycol, tetramethylene glycol, trimethylol propane, and pentaerythritol, and the like. These fatty acid polyesters have a low acid number (below 12) a hydroxyl number of at least 30, preferably between 100 and 400, and are essentially free of water. The fatty acid polyesters may be admixed with or substituted in part by esters of polycarboxylic acids.

Of especial value and utility are the fatty acid polyesters prepared by the condensation of castor oil, pentaerythritol and phthalic anhydride to give a polyester of acid number below about 12 and hydroxyl number of about 100–150, and by condensation of trimethylolpropane with dimerized fatty acids and adipic acid to a polyester of low acid number and hydroxyl a value of about 125–200. These fatty acid polyesters when combined with methylene-bis-(4-cyclohexylisocyanate) in the manner of my invention give rise to coatings distinguished by their surprisingly excellent gloss retention character.

The coating compostions of this invention are applied in the manner of the conventional "two-can" formulations. Thus, the isocyanate component and the polyester component are separately prepared and just prior to application, admixed in the desired proportions, and consumed.

The mixing ratio of the two components is such that the final coating composition contains between about 20% and 80% solids preferably between 35% and 50% solids (by weight), the balance being volatile solvent. The concentration of active components is adjusted so that the ratio of NCO groups to alcoholic hydroxyl groups is within the range of 1.5 to 1.0 and preferably from 1.3 to 1.0 to 1.1 to 1.0. Catalysts to enhance the reaction of the isocyanate and polyol such as lead naphthenate, dibutyl tin dilaurate may be added to the coating composition if desired.

The novel coating compositions comprise a volatile solvent as a carrier of the reactive components. Suitable solvents for this purpose include the usual lacquer type organic solvents, typical examples of which are ethyl acetate, butyl acetate, cyclohexanone, toluene, xylene, bis($\beta$-ethoxyethyl)ether, glycol monoethylether acetate and the like. Mixtures of these and equivalent solvents can be used.

As mentioned above, a catalyst can be used to promote the formation of the urethane reaction product. Typical examples of these include not only the well-known metal "driers" such as lead naphthenate but also organotin compounds such as Dibutyl tin dilaurate
Tetramethyl tin
Dimethyl dioctyl tin
Di-lauryl tin difluoride
Di-2-ethylhexyltin.bis(monobutylmaleate)
Tri-n-butyl tin acetonate Tertiary amines such as for example N,N-dimethylpiperazine
Triethylamine
N-methylmorpholine can also be used. Mixtures of these types of catalytic substances as well as equivalent compounds are contemplated in this connection also.

These novel coating compositions can also contain pigments, fillers, flowing agents, other resins, and the like adjuvants. They can be applied to any suitable substrate at room temperature or above. The coatings can be dried at ambient temperature or in conventional baking ovens. The films prepared from these coating compositions dry "tack-free" in 6 to 12 hours and reach their maximum properties after about a week or more at ambient temperature.

The following examples illustrate the present invention. Parts and percentages are by weight and temperatures are given in degrees centigrade.

*Example I*

An adduct of methylene-bis-(4-cyclohexylisocyanate) is prepared by heating together in a nitrogen atmosphere 107 parts of trimethylol propane, 786 parts of methylene-bis-4-cyclohexylisocyanate) and 893 parts of glycol monoethylether acetate. The mixture is heated at 75° for about 2½ hours. The isocyanate equivalent weight of the resultant adduct is 490.

A castor oil alkyd is prepared by heating a mixture of 926 parts of castor oil, 181 parts of pentaerythritol and 0.4 part of 24% lead naphthenate in an atmosphere of nitrogen at 250° for two hours. The mass is cooled to about 100° and 296 parts of phthalic anhydride and 87 parts of xylene are added. The mixture is heated to 220°, while removing the water formed azeotropically. A Dean-Stark trap is used to separate the water from the xylene prior to returning the latter to the reaction mass. The heating is continued until the acid number of the polyester is 10. About 50 parts of xylene remained in the mass which, after cooling is diluted with 410 parts of glycol monoethylether acetate. The hydroxyl value of this polyester is 110.

A coating composition prepared by mixing equal parts of the adduct and alkyd thus prepared is applied by brushing to a wood panel. The coating dried "tack-free" in seven to eight hours.

This composition is pigmented with Titanox RA pigment (40% of solids content) and compared with a similarly prepared composition from tolylene diisocyanate-trimethylol propane adduct and the same castor oil alkyd. The coatings are prepared on steel panels and dried in an oven at 100° for one hour. The results of the comparison are given in Table I below.

TABLE I

| Test | "TDI"-Adduct Castor Oil Alkyd | "MBCI"-Adduct Castor Oil Alkyd |
|---|---|---|
| NCO/OH Ratio | 1.0/1.0 | 1.0/1.0 |
| Discoloration After 100 hrs | Considerable | Negligible |
| Gloss (60° Specular): | | |
| Initial | 94 | 94 |
| After 64 hrs | 92 | 91 |
| After 205 hrs | 87 | 74 |
| After 337 hrs | 30 | 67 |
| | <10 | |

*Example II*

A coating composition is prepared by mixing equal parts of the solution of methylene-bis-(4-cyclohexylisocyanate) in glycol monoethylether acetate, and the castor oil alkyd, prepared as described in Example I above. The coating composition pigmented with Titanox RA and applied as described in Example I gives a coating which is even more gloss retentive than the coating of Example I, since its gloss rating after 337 hours exposure in the Weatherometer was 80.

*Example III*

A mixture of 522 parts dimerized fatty acids ("Empol 1022") 117 parts adipic acid, 268 parts of trimethylolpropane and 100 parts of xylene is heated in an inert atmosphere to 220°. The water formed is removed azeotropically through a Dean-Stark trap. The heating is continued until the acid number of the product is 3.5. Thereafter all but about 40 parts of the xylene is removed and 245 parts of glycol monoethylether acetate are added. The polyester has a hydroxyl value of 148. Solids=75%.

A coating composition is prepared by mixing 380 parts of this polyester with 490 parts of the methylene-bis-(4-cyclohexylisocyanate) adduct prepared in Example I above.

The composition, pigmented with Titanox RA pigment (40% of solids content), is applied to steel panels and dried in air and by baking at 100° for one hour. The panels are compared with similarly prepared test panels coated with the coating composition of Example I. All coatings contain 37% of methylene-bis-(4-cyclohexylisocyanate). The results of this comparison are given in Table II.

TABLE II

| Test | Dimer Acid Air Dry | Coating Baked | Castor Oil Air Dry | Alkyd Coating Baked |
|---|---|---|---|---|
| Dry Time (hrs.) | 18-24 | | 7-8 | |
| Hardness (Sward) | 44 | 34 | 40 | 41 |
| Flexibility | Excellent | Excellent | Excellent | Excellent |
| Discoloration (300 hrs.) | Moderate | Moderate | Slight | Slight |
| Gloss (60° Specular): | | | | |
| Initial | 83 | 85 | 87 | 90 |
| After 100 hrs | 83 | 84 | 87 | 87 |
| After 200 hrs | 90 | 89 | 91 | 91 |
| After 300 hrs | 86 | 90 | 65 | 65 |

*Example IV*

A coating composition is prepared by mixing 262 parts of the dimer acid polyester prepared in Example III with 380 parts of the solution of methylene-bis-(4-chlorohexylisocyanate) prepared as described in Example II. After addition of 0.4 part of a 24% solution of lead naphthenate, the coating is flow coated onto a steel test panel. The coating dried, "tack-free," in air in six to seven hours and is excellent with respect to resistance to discoloration and gloss-retention on weathering.

It can thus be seen that novel and eminently useful urethane coating compositions have been devised. The above examples and variations alluded to in this specification has been given for the purpose of illustrating the scope of the invention. Other variations in the details set out above can be made as will be obvious to those skilled in this art. Such variations which do not depart from the spirit of the invention are to be included within the scope of the invention which is limited only to the claims appended hereto.

I claim:

1. A coating composition characterized by excellent retention of gloss on weathering consisting essentially of a reaction product dissolved in an inert organic solvent of an isocyanate selected from the group consisting of methylene-bis-(4-cyclohexylisocyanate) and an adduct of methylene-bis-(4-cyclohexylisocyanate) with a polyhydroxy organic compound, said adduct having free isocyanato groups, and a polyester of a fatty acid having free hydroxyl groups having a hydroxy number of at least 30 formed from a fatty acid and a polyol having a molecular weight of from 62 to 164, the ratio of NCO groups to hydroxyl groups of said reaction product being within the range of 1.5 to 1.0.

2. A coating composition characterized by excellent retention of gloss on weathering consisting essentially of a reaction product of methylene-bis-(4-cyclohexylisocyanate) dissolved in an inert organic solvent and a polyester of a fatty acid having free hydroxyl groups having a hydroxyl number of at least 30 formed from a fatty acid and a polyol having a molecular weight of from 62 to 164 dissolved in an inert organic solvent, the ratio of NCO groups to hydroxyl groups of said reaction product being within the range of 1.5 to 1.0.

3. A composition as claimed in claim 2 wherein said fatty acid is derived from castor oil and wherein said polyester has a hydroxyl number of about 100–150.

4. A composition as claimed in claim 2 wherein said fatty acids are dimerized fatty acids and wherein said polyester has a hydroxy number of about 125-200.

5. A coating composition characterized by excellent retention of gloss on weathering consisting essentially of a reaction product of an adduct of methylene-bis-(4-cyclohexylisocyanate) with a polyhydroxy organic compound dissolved in an inert organic solvent, said adduct having free isocyanato groups, and a polyester of a fatty acid having free hydroxyl groups having a hydroxyl number of at least 30 formed from a fatty acid and a polyol having a molecular weight of from 62 to 164 dissolved in an inert organic solvent, the ratio of NCO groups to hydroxyl groups of said reaction product being within the range of 1.5 to 1.0.

6. A composition as claimed in claim 5 wherein said fatty acid is derived from castor oil and wherein said polyester has a hydroxyl number of about 100-150.

7. A composition as claimed in claim 5 wherein said fatty acids are dimerized fatty acids and wherein said polyester has a hydroxyl number of about 125-200.

8. A method of producing coating compositions characterized by excellent retention of gloss on weathering comprising reacting a mixture consisting essentially of methylene-bis-(4-cyclohexylisocyanate) in an inert organic solvent and a polyester of a fatty acid having free hydroxyl groups having a hydroxyl number of at least 30 formed from a fatty acid and a polyol having a molecular weight of from 62 to 164 in an inert organic solvent in such proportions to produce a ratio of NCO groups to hydroxyl groups in said composition within the range of 1.5 to 1.0.

9. A method as claimed in claim 8 wherein the fatty acid is derived from castor oil.

10. A method as claimed in claim 8 wherein the fatty acids are dimerized fatty acids.

11. A method of producing coating compositions characterized by excellent retention of gloss on weathering comprising reacting a mixture consisting essentially of an adduct of methylene-bis-(4-cyclohexylisocyanate) with a polyhydroxy organic compound dissolved in an inert organic solvent, said adduct having free isocyanato groups, and a polyester of a fatty acid having free hydroxyl groups having a hydroxyl number of at least 30 formed from a fatty acid and a polyol having a molecular weight of from 62 to 164 dissolved in an inert organic solvent in such proportions to produce a ratio of NCO groups to hydroxyl groups in said composition within the range of 1.5 to 1.0.

12. A method as claimed in claim 11 wherein the fatty acid is derived from castor oil.

13. A method as claimed in claim 11 wherein the fatty acids are dimerized fatty acids.

References Cited

UNITED STATES PATENTS

| 2,888,412 | 5/1959 | Bender | 260—18 |
| 3,012,987 | 12/1961 | Ansul | 260—22 |
| 3,015,634 | 1/1962 | Ferrigno | 260—18 |
| 3,084,177 | 4/1963 | Hostettler et al. | 260—77.5 |
| 3,106,537 | 10/1963 | Simon et al. | 260—22 |

FOREIGN PATENTS 773,897   5/1957   Great Britain.

DONALD E. CZAJA, *Primary Examiner.*

LEON J. BERCOVITZ, *Examiner.*

R. W. GRIFFIN, *Assistant Examiner.*